(12) United States Patent
Slaght et al.

(10) Patent No.: US 6,345,470 B1
(45) Date of Patent: Feb. 12, 2002

(54) SELF-CONTAINED AUTOMATIC WATERING SYSTEM FOR INDOOR OR OUTDOOR PLANTS

(75) Inventors: Martin Lynch Slaght; Nevin C. Jenkins; Rande W. Newberry, all of Homosassa; Antonio Lebron, Spring Hill, all of FL (US)

(73) Assignee: Fashion Nails, Inc., Homosassa, FL (US)

( * ) Notice: Subject to any disclaimer, the term of this patent is extended or adjusted under 35 U.S.C. 154(b) by 0 days.

(21) Appl. No.: 09/438,751

(22) Filed: Nov. 11, 1999

(51) Int. Cl.[7] .............................................. A01G 27/02
(52) U.S. Cl. ...................................................... 47/79
(58) Field of Search ........................... 47/79, 40.5, 59, 47/60, 63; 119/246, 247, 255, 259

(56) References Cited

U.S. PATENT DOCUMENTS

| | | | | |
|---|---|---|---|---|
| 4,051,627 A | * | 10/1977 | Schilling, Jr. ............... | 47/79 X |
| 4,805,342 A | * | 2/1989 | Jenkins et al. ................. | 47/79 |
| 4,930,252 A | * | 6/1990 | Krause et al. ................ | 47/40.5 |
| 4,934,096 A | * | 6/1990 | Bentvelsen ................ | 47/79 X |
| 5,127,366 A | * | 7/1992 | Kim .......................... | 47/79 X |
| 5,440,836 A | * | 8/1995 | Lee ................................. | 47/60 |
| 5,491,928 A | * | 2/1996 | Potochink ........................ | 47/79 |
| 5,596,839 A | * | 1/1997 | Ellis-El .......................... | 47/79 |
| 5,749,170 A | * | 5/1998 | Furuta ........................ | 47/79 X |
| 5,826,374 A | * | 10/1998 | Baca ............................. | 47/62 |

FOREIGN PATENT DOCUMENTS

| | | | |
|---|---|---|---|
| EP | 0958737 A1 | * | 11/1999 |
| JP | 409205910 A | * | 8/1997 |

* cited by examiner

Primary Examiner—Peter M. Poon
Assistant Examiner—Jeffrey L. Gellner
(74) Attorney, Agent, or Firm—Martin Fleit; Paul Bianco (57) ABSTRACT

A self-contained automatic watering method and system for plants that includes a container made up of an inner and outer pot nested together to define an annular space which serves as a reservoir for water to be used for watering a plant held in the inner pot. A distributor in the form of an inclined wall is located on the container at least partially surrounding a plant held in the container. A housing is easily detachably mounted on said container and extends into the reservoir. The housing contains a pump, a motor to drive the pump, and a conduit leading from the pump to the distributor for directing water into a plant held in the inner pot, and a controller for controlling the motor to initiate watering cycles according to a preselected program regarding the frequency of watering and quantity of water.

13 Claims, 12 Drawing Sheets

SELF-CONTAINED AUTOMATIC WATERING SYSTEM FOR INDOOR OR OUTDOOR PLANTS

BACKGROUND OF THE INVENTION

1. Field of the Invention

The present invention relates to a self-contained automatic watering system for indoor or outdoor plants, and more particularly, to a nested pot arrangement for holding a plant in the inner pot with a water reservoir defined between the pots and an automatically controlled system to pump water from the reservoir at specific time intervals and in specific amounts to selected portions of the inner pot in which the plant is potted.

2. Description of the Prior Art

A variety of self-watering pots and systems are known, for watering plants at intervals, but most are only suitable for watering plants that are essentially kept outdoors on patios and porches. Very few systems have been advanced for regular in home use. This is partly due to the fact that no system or structure has been advanced which can effectively and inexpensively effect watering of plants, particularly house plants. Such prior systems and structures that have been proposed are either too cumbersome, and therefore, not attractive to a user, are too complicated and therefore, too expensive, or too difficult for the home owner to repair. Also, such systems are not easily maintained.

SUMMARY OF THE INVENTION

It is the principal object of the present invention to supply to the market-place a watering system for potted plants that overcomes the drawbacks and disadvantages of the prior art, and will be simple to use, simple to service, and will be relatively inexpensive and, therefore, will be affordable. This object is accomplished by the provision of a system that utilizes a nested pot arrangement, with a reservoir defined in the annular space between an outer pot and an inner pot. The inner pot serves as a container for the plant. The novel system of the present invention includes a unique delivery of water from the reservoir to distribute water to the plant circumferentially, at the outer perimeter of the plants root system, as well as, directing water into the base of the plant or foliage of the plant. The novel system provides an electronic control of the water delivery to enable the quantity, frequency and timing to be selected by the plant owner, and thereby, tailor the water delivery to the needs of the plant, even when the plant owner is unavailable or absent for prolonged periods of time. Further, the operating components are contained in a modular housing so that it can be readily removed for repair or servicing or return for factory servicing while replaced with a new housing.

Other and further objects and advantages of the present invention will become apparent from the following detailed description of a preferred embodiment of the invention when taken with the appended drawings.

DETAILED DESCRIPTION OF PREFERRED EMBODIMENT

Referring now to the drawings, a preferred embodiment of the novel watering system will be described in detail. FIGS. 1–4 show the assembled novel watering system and its component parts. As shown, an outer pot 20 of inverted frusto-conical shape supports an inner pot 30 of inverted frusto-conical shape of smaller dimensions. A drip tray 40 receives the bottom of outer pot 20. Pot 20 defines a shoulder 22 between upper section 24 and lower section 26. The bottom 28 of pot 20 is of reduced circular section by virtue of shoulder 38 and sized to fit into and be supported by the drip tray 40. At the center of the flat bottom 32 of pot 20, a hollow open-ended vertical tube 34 is defined with a bottom opening 36 and a top opening 38. An upper skirt 42 is defined by a further shoulder 44 of pot 20 and terminates in a top opening defined by top rim 46. Skirt 42 is bowed slightly outwardly.

Drip pan 40 has internal ribs 48 of cruciform shape to hold the bottom 28 of pot 20 in slightly spaced relation. The ribs 48 extend along the inner bottom of pan 40 and up the sides of surrounding skirt 50. The outer diameter of the bottom 28 is slightly tapered and sized to fit loosely within the pan 40.

Figure 1:
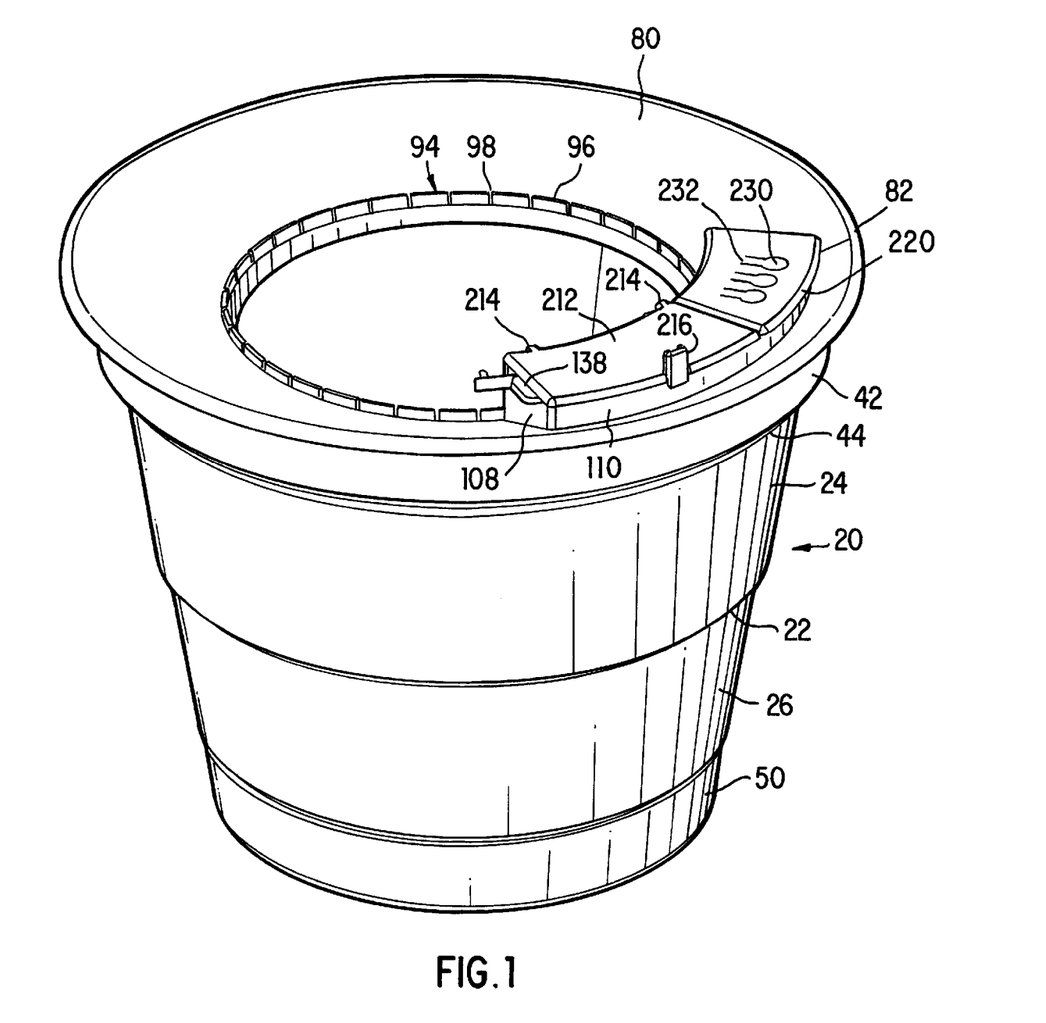
FIG. 1 is a perspective view of the novel watering system of the present invention.
Figure 2:
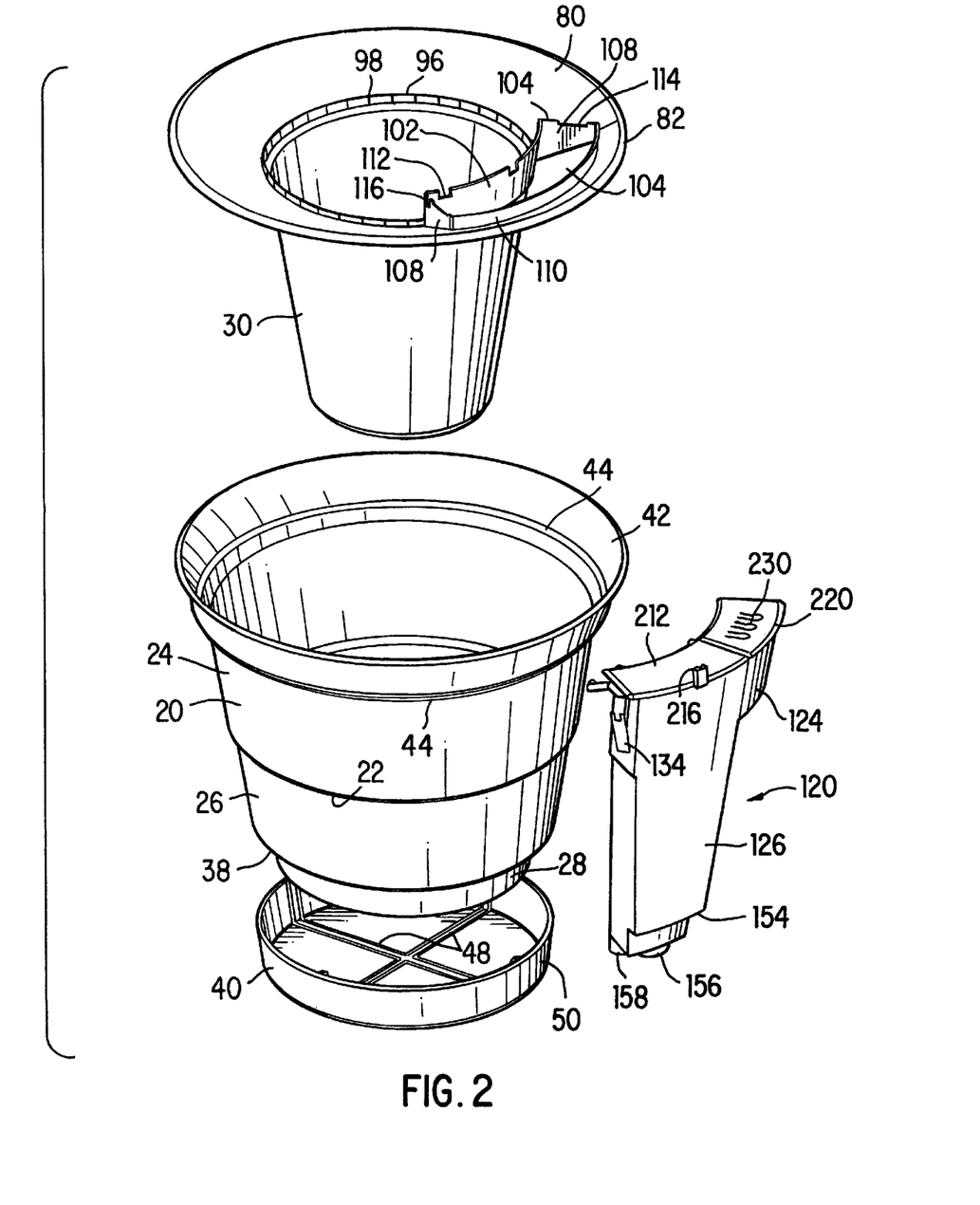
FIG. 2 is an exploded view of the main components of the novel watering system of the present invention.
Figure 3:
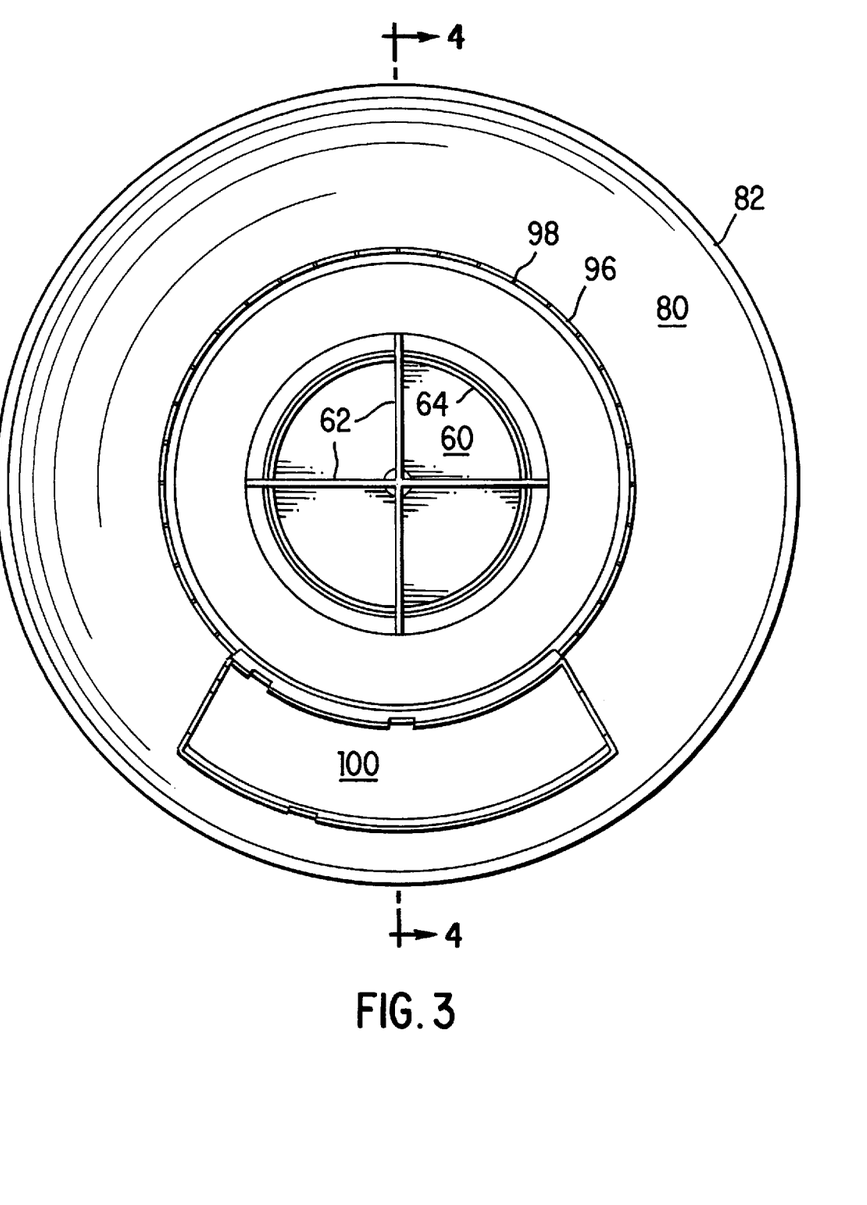
FIG. 3 is a top plan view of the novel watering system of the present invention.
Figure 4:
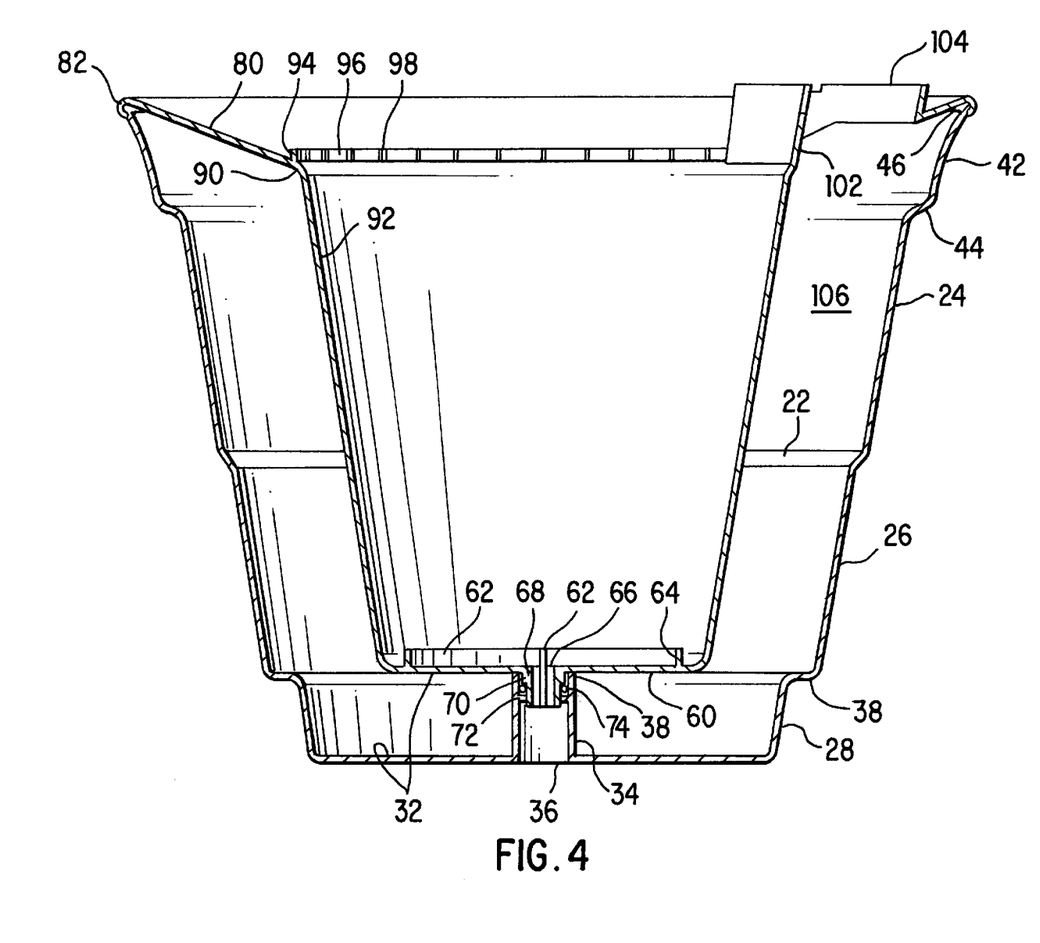
FIG. 4 is a view in section taken along line 4—4 of FIG. 3.
Figure 5:
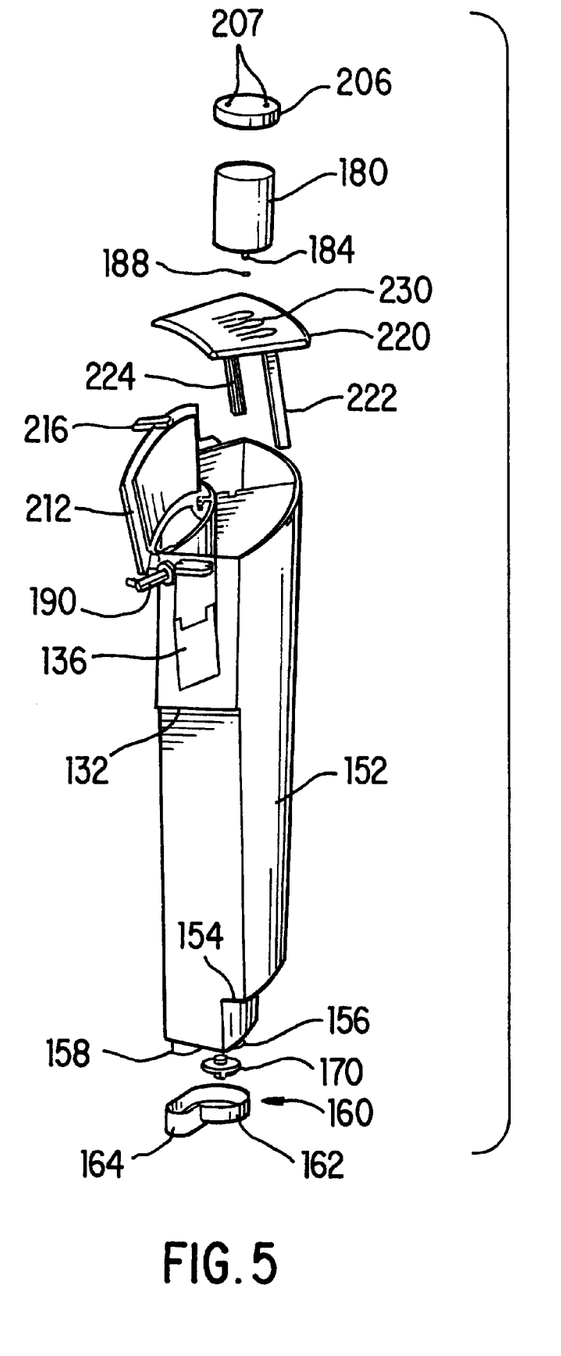
FIG. 5 is an exploded view of the control compartment.
Figure 6:
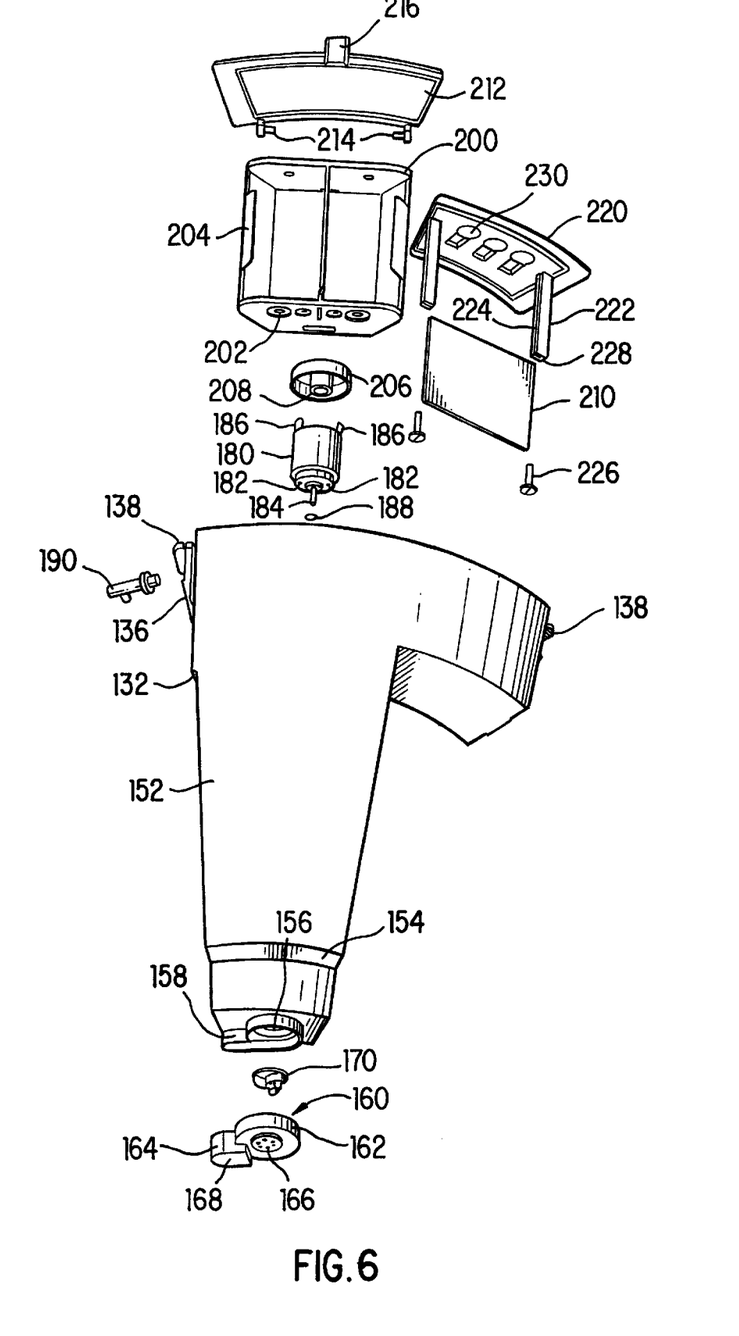
FIG. 6 is a view like FIG. 5, an exploded view, of the control compartment and its contents.

Nested in outer pot 20 is inner pot 30 which has a flat bottom 60 on which are located a pair of raised ribs 62 arranged at right angles within a raised circular skirt 64 of the same height. The bottom 60 defines a central hole 66 and depending tube 68 which is received in cylinder or tube 34. Each of tube 68 and tube 34 defines shoulders 70 and 72, respectively, between which is positioned an O-ring 74 to act as a seal. One of the ribs 62 extends into tube 68, as shown in FIG. 4. This arrangement provides drainage for the inner pot 30. An inclined skirt 80 extends from the top of the frustoconical main part of inner pot 30 and terminates in a top rim 82 that matches and registers with the top rim 46 of the outer pot 20. Rim 82 curls over and around the top rim 46 of the outer pot 20 so that it will readily detachably snap on to the rim. Around the inner periphery 90 of inner pot 30 at the juncture between the inclined skirt or wall 80 and the main frusto-conical wall 92 of the inner pot 30 is a divided circular vertical wall 94 composed of arcuate sections 96 spaced from one another by a gap 98. Inclined wall 80 extends around the periphery of pot 30 except for a short arc designated 100, see FIGS. 3 and 4. Within the arc 100, the main wall 92 of the inner pot 30 has an extension 102 that extends vertically to the slightly above the top of inner pot 30. To this end, the outer part of arc 100 and its peripherally spaced end all have wall parts 108 and 110 that extend to same height as extension 102 to define together an arcuate opening 104 that leads into the annular space 106 defined between pots 20 and 30.

Figure 7:
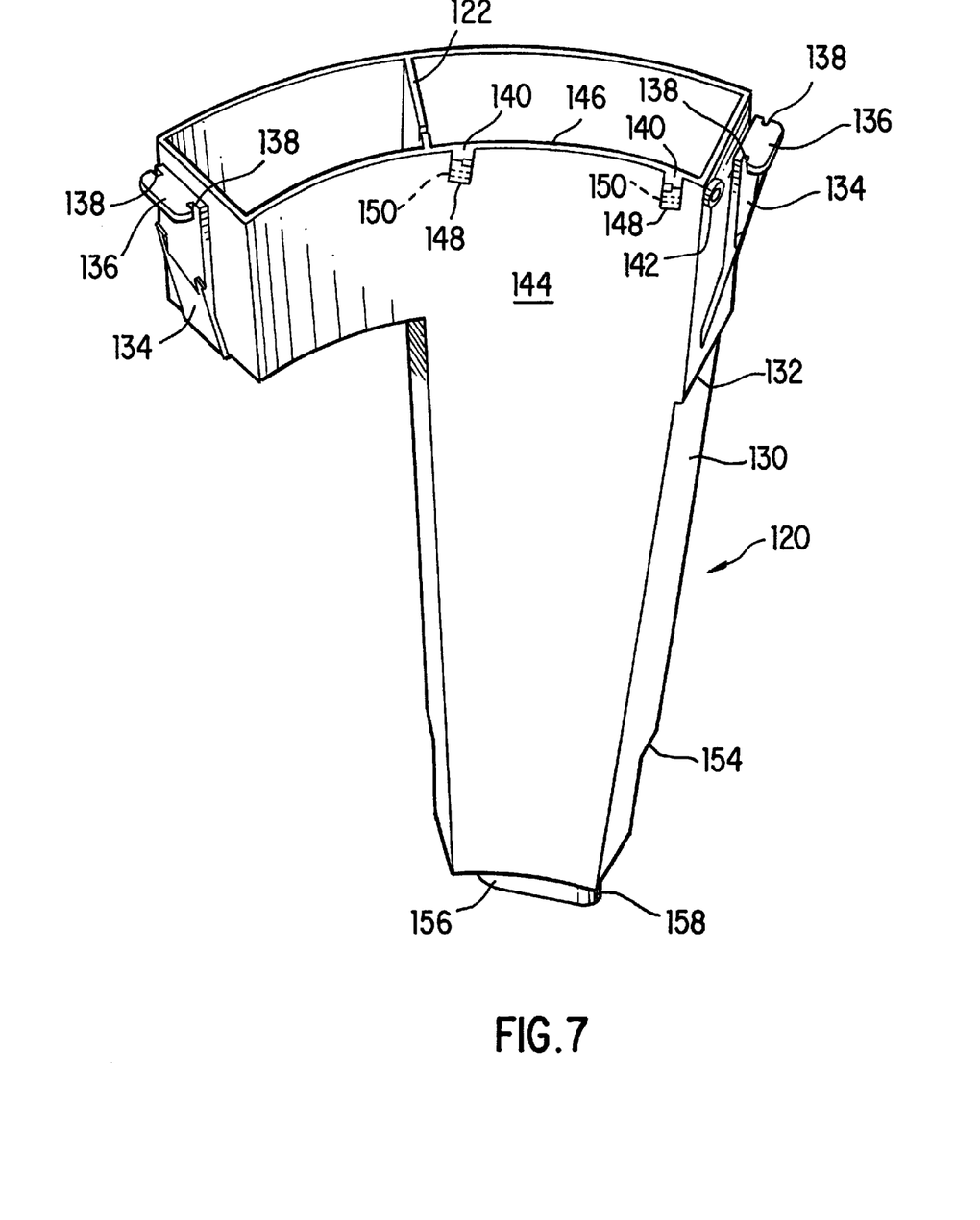
FIG. 7 is a perspective view of the control compartment housing.
Figures 8, 9:
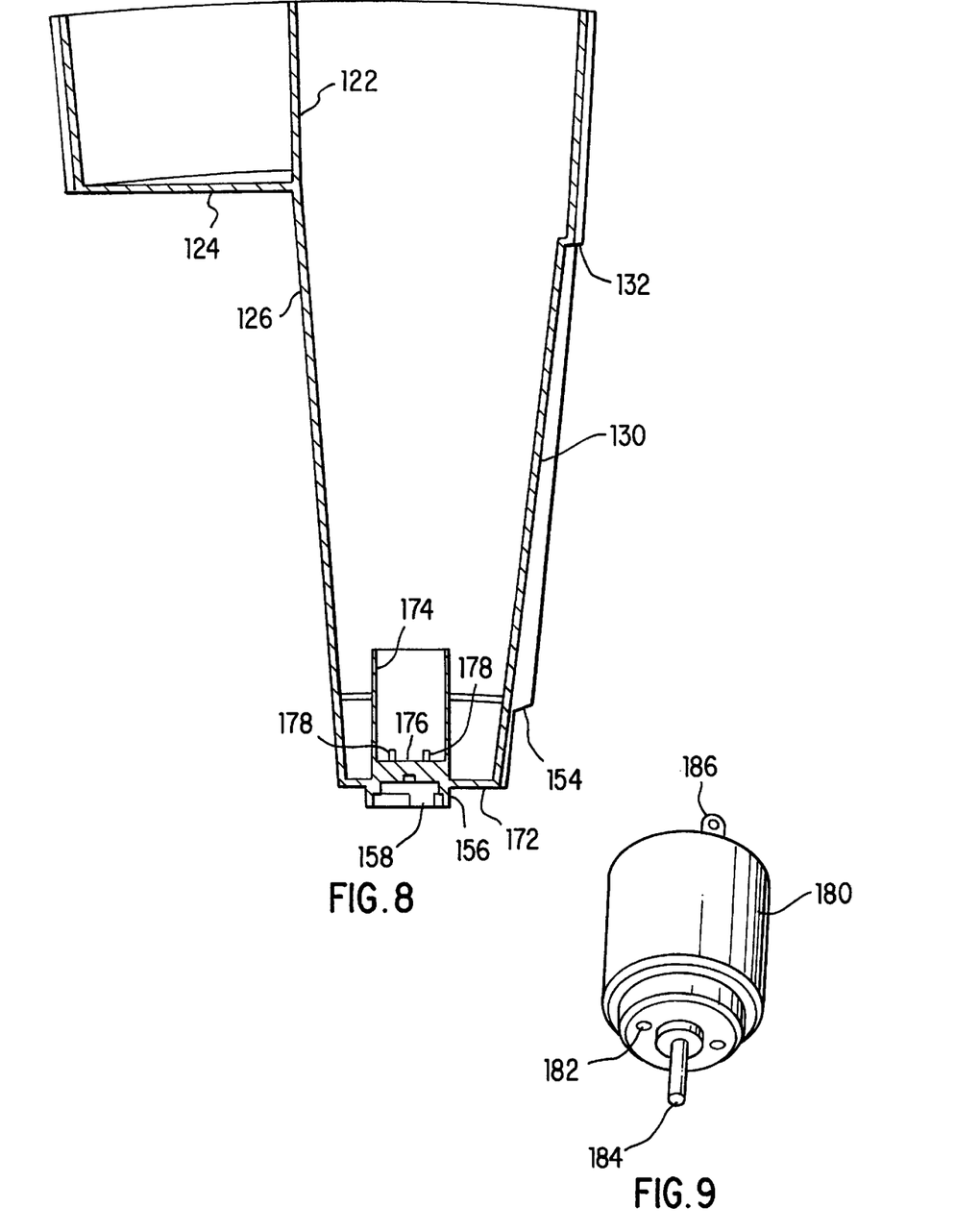
FIG. 8 is a view in section of FIG. 7 taken along line 8—8.
FIG. 9 is a view in perspective of the pump motor.
Figure 10:
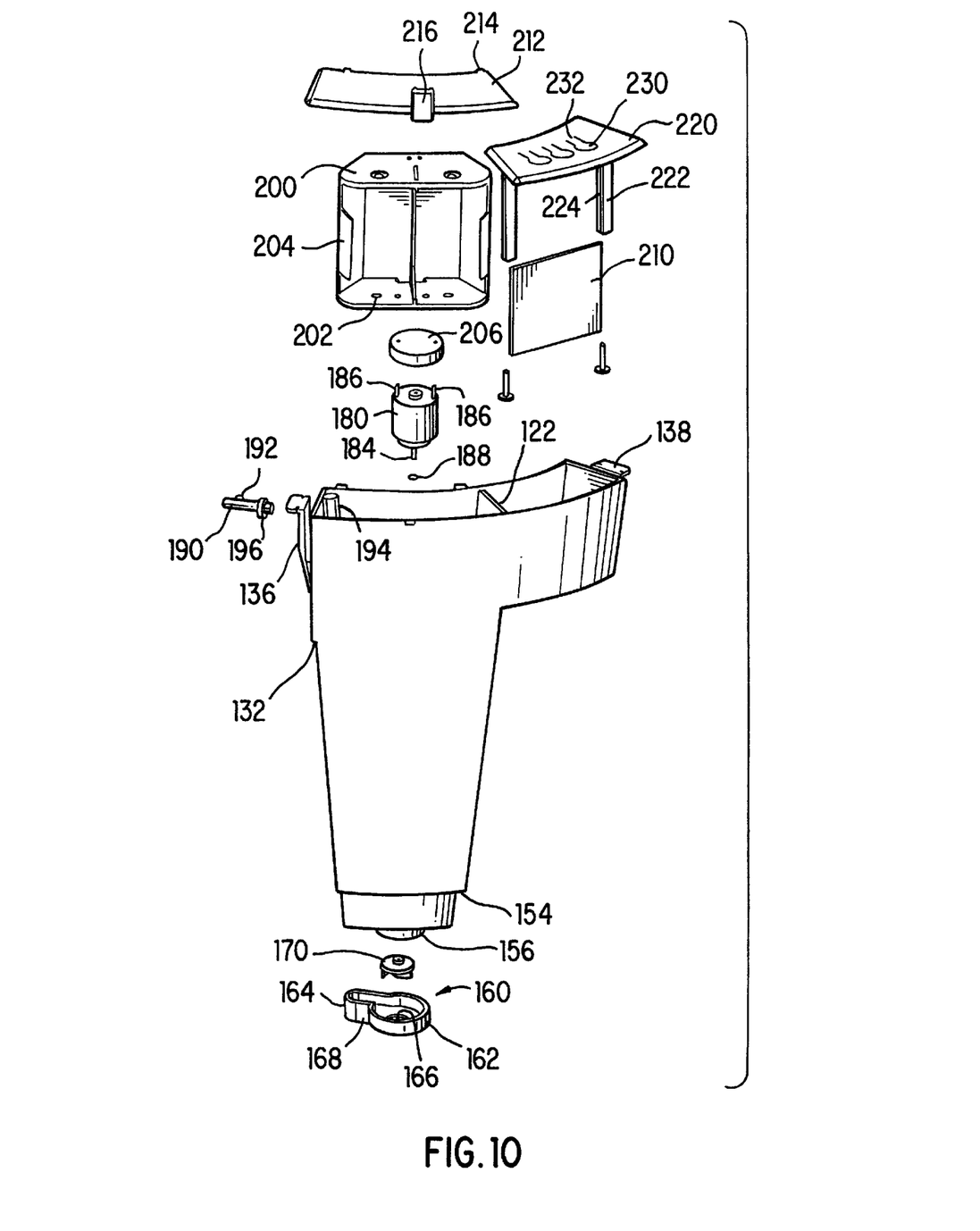
FIG. 10 is another exploded view of the control compartment and its contents.

Wall extension 102 defines a pair of slots 112. Wall parts 108 each define a wide slot 114. One of the wall parts 108 defines a narrow slot 116. Fitted into the arc 100 and the opening 104 is an L-shaped arcuate housing 120, with the horizontal leg 124 of the L at the top. Referring now to FIGS. 7 and 8, the housing 120 is arcuate and matches with the arcuate opening 104 and is subdivided by an internal wall 122 into a first compartment comprising essentially the horizontal leg 124, and a second larger tapered compartment comprising essentially the vertical leg 126. Both compartments are arcuate in horizontal cross section. The outer vertical wall 130 of leg 126 defines a shoulder 132. Each end vertical wall of arcuate housing 120, on its outer side has mounted thereon a spring clamp 134 which is fixed at its bottom to the end wall, and provided at its top with a finger flange 136 having side slots 138 to adapt it to interact with slot 108 to detachably hold the housing 120 in the opening 104 supported by the end walls 108. Outer wall 130 also defines a through hole with a short stub shaft 142 projecting therefrom. The inside arcuate vertical wall 144 of housing 120 defines at its upper lip 146, a pair of spaced horizontal projections 140 which terminate in bosses 148 which define axial through holes 150. When housing 120 is situated in opening 104, projections 140 are received in slots 112 in a loose fit to allow drainage into the annular space.

At the bottom of the second tapered compartment, on the outer arcuate vertical wall 152, a shoulder 154 is defined. At the bottom wall 172 of the compartment is formed a stepped circular depending skirt 156 having a tangential extension 158. A cap 160 comprised of a circular rim 162 with a tangential extension 164 is sized to fit closely over the skirt 156 and extension 158 to form a seal therebetween. The bottom of cap 160 is provided with holes 166 to allow liquid to enter the space between skirt 156 and cap 160. Extension 164 is thicker than rim 162 and has a portion 168 that extends beneath the cap 160 to hold cap 160 spaced above the bottom of the outer pot 20 when the housing 120 is positioned in the arcuate opening 104. Positioned between the skirt 156 and the cap 160 is an impeller 170 consisting of a disc with impellers or vanes formed on its lower surface and a through axial hole. Inside the bottom 172 of the housing 120 is an upstanding open-topped cylinder 174 with a mounting plate 176 positioned in its bottom. Mounting plate 176 has an axial hole and two horizontally spaced vertically pins 178 which serve as motor locating pins.

Referring to FIG. 9, a pump motor 180 is positioned or mounted within the cylinder 174 and is provided with two matching holes 182 for receiving the pins 178. The motor 180 has, on one axial end, an output or drive shaft 184, and, on the other end, a pair of connection terminals 186 for leads to the motor. The shaft 184 fits through the axial hole in the mounting plate 176 and has the impeller 170 mounted on it. A conduit 194 leads from the extension 158 from the bottom of the housing to the top where it connects with the stub 142. Also received in the stub 142 is a pipe 190 having a flange 196 and a T-connection 192. The diameter of the pipe 190 and the tee 192 are sized so that water pumped by the motor-pump set passes up the conduit 194 and exits stub 142 where it is delivered to pipe 190. A portion of the water is taken off through the tee 192. Pipe 190 is directed to discharge water tangentially onto inclined wall 80 where it runs around the wall 80 while distributing the water peripherally around the inner pot 30. The water flows around and down the inclined wall 80 passing through the gaps 98. A portion of the water stream is diverted through the tee 192 and is directed radially into the pot 30. Preferably, the tee 192 directs the water upwardly at an acute angle, from 30 to 60 degrees, so that the stream of water sprays into the foliage of a plant contained in the inner pot. However, tee 192 can be positioned to direct water at the base of the plant. Flange 196 acts to seal pipe 190 against stub 142. The portion of pipe 190 which connects with stub 142 may have an internal diameter that is slightly larger than the outer diameter of stub 142 or an outer diameter slightly smaller than the internal diameter of stub 142 to facilitate a good press seal, while allowing pipe 190 to be rotated relative to stub 142 to be positioned as desired. Flange 196 acts as a stop.

A battery holder 200, designed to hold two batteries, is provided with contacts 202 for the batteries and spring clips 204 to hold the batteries in the holder. The holder 200, in position, rests on shoulder 132. The motor 180 is received in the cylinder 174, as described, and a cap 206 having a central depending tube 208 is seated and sealed on cylinder 174 in an airtight manner. Tube covers the end of the motor. Wires lead (not shown) from the batteries and a printed circuit board 210 supply power to the motor 180. The leads pass through and are sealed in openings 207 of cap 206, and are connected to the terminals 186 of motor 180. A battery cover 212 having projecting pins 214 on one side and a snap tab 216 on the opposite side closes the compartment above the battery holder 200, while allowing access to change batteries. Pins 214 cooperate with the bosses 148 in a known manner to form a hinge and snap tab 216 detachably closes the cover 212 to the rim of the compartment in a known manner. A cover 220 having vertically depending spaced rods 222 closes the first compartment in leg 130. Rods 222 have inwardly facing slots 224 and are spaced to receive circuit board 210. Screws 226 are received in threaded axial bores 228 at the bottom of the rods 222 to hold the circuit board 210 in position. The bottom of the screws 226 rest on the bottom of the compartment in leg 124. Three key shaped cutout tabs 230 are defined in the cover 220 with one portion 232 of each tab 230 uncut to serve as a hinge. The upper surface of the cover 220 is covered with mylar or some protective sheet material (plastic) that can receive ink so that instructions can be imprinted on the cover 220 describing the function of each cutout tab, key or button 230 of the keypad.

Figure 11:
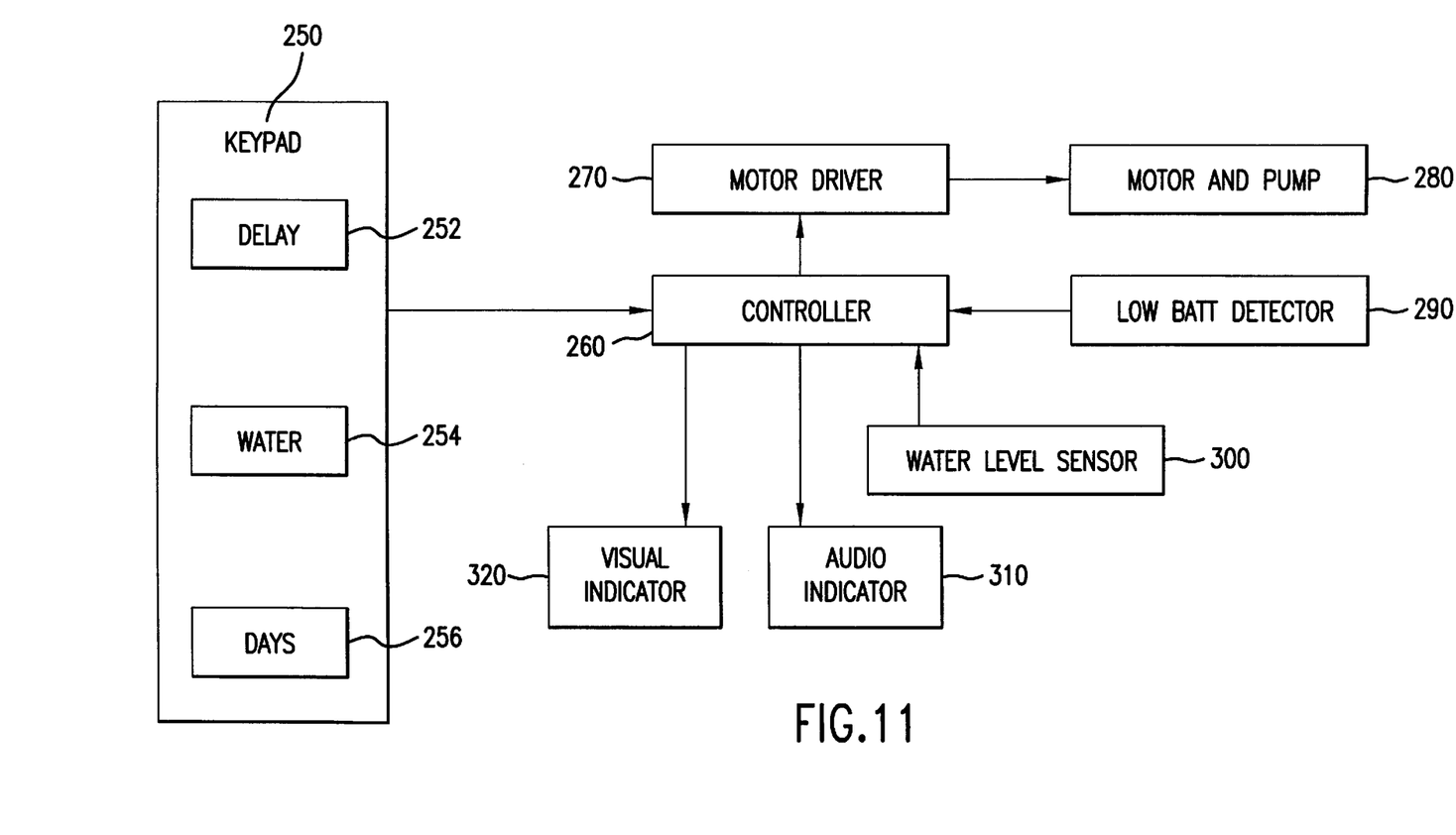
FIG. 11 is a block diagram of electronic control.

Referring now to FIG. 11, the electronic control of the system is shown in block diagram. As shown, the keypad 250, constituted of the upper surface of the cover and the three keys 230, has the keys 252, 254 and 256 designated as DELAY, WATER and DAYS, respectively. The keys of the keypad 250 are connected to a controller 260 which may be a microprocessor or processing chip formed with the requisite program as will become more apparent from the description of the flow chart of FIG. 12. Controller 260 controls the motor drive circuit 270 which actuates the motor-pump set 280 in a known. The system is provided with a low battery detector 290 of known design, a water level is sensed by monitoring the current of the motor. When the controller 260 senses a change, due to the absence of water in the water reservoir defined by the annular space between the inner and outer pots 20 and 30, an audio indicator 310, such as a beeper of known design which is controlled by the controller 260 in a known manner and a visual indicator 320, such as an LED which is controlled by the controller 260 in a known manner signal the need to add water. Motor-pump set 280 is shut down. When water is added to the reservoir, liquid fertilizer can be also added or mixed with the water added to or already in the reservoir.

Figure 12:
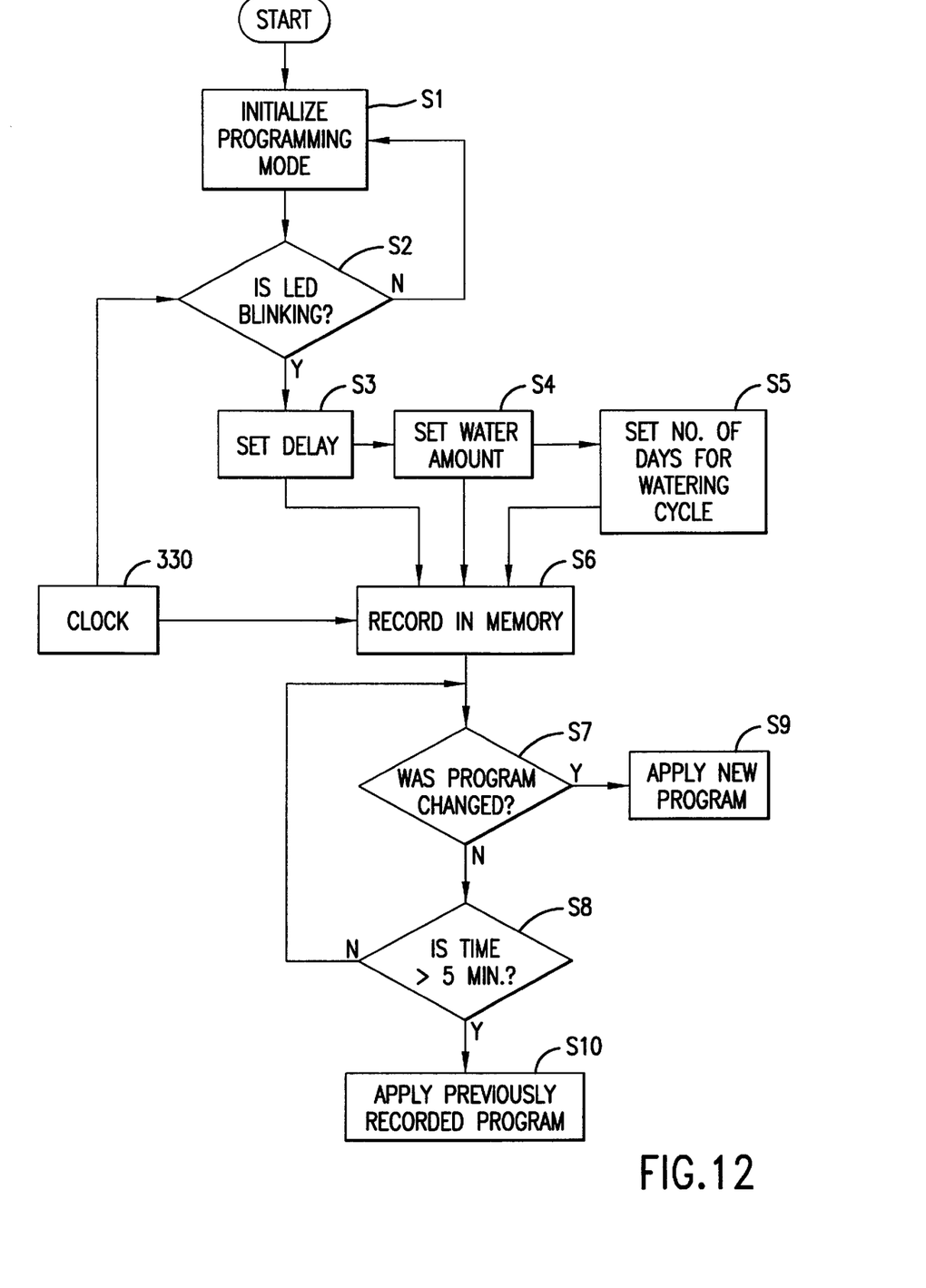
FIG. 12 is a flow chart of the electronic control.

The operation of the control of the watering system will be better understood from the flow chart of FIG. 12. The programming of the microprocessor or processing chip 260 will be evident to those skilled in the art from the flow chart of FIG. 12. The programming mode is initiated in step S1 by holding down keys DELAY 252 and DAYS 256 until the controller 260 makes the LED 320 start to blink. This action takes about 3 seconds. In step S2, the LED is checked to see if it is blinking. If N or no, then the program loops back to step S1. If Y or yes, the program continues to step S3 where the delay is set. The delay sets the initial delay for the watering cycle. If DELAY key 252 is pressed once, a one hour delay is set, if pressed twice, a two hour delay is set, and so forth up to a twenty hour delay. The delay determined in step S3 is sent to the memory in step S6 and recorded. Each time the delay key 252 is pressed, the beeper 320 sounds a beep. In step S4, the water quantity is determined and set. The WATER key 254 is pressed and held for a time duration determined by the user, and a quantity of water to be dispensed in accordance with the duration of the time that the key 254 is held down will be set and sent to the memory and recorded in step S6. If the programming mode has not been initiated, holding down the WATER key 254 will initialize the controller 260 to activate the motor driver 270 to operate the motor-pump 280 to pump water for as long as WATER key 254 is held down, for a manual watering cycle.

When the DAYS key 256 is pressed in step S5, this determines the frequency or how often the watering cycle is applied. Pressing the DAYS key 256 once sets watering for every day, pressing twice sets watering for every other day, pressing three times sets watering for every third day, and so forth up to pressing seven times for setting watering for once per week. The frequency setting is recorded in memory in step S6. As noted earlier in the description, each time a key is pressed in the programming mode, the audio indicator or beeper 310 beeps. If no keys are pressed after entering the programming mode for a period of 5 minutes, or some other preselected time, the programming mode automatically terminates. Once the programming mode has been entered, the program makes a decision in step S7 whether or not the previous program has been changed. When delivered, the program is set to a default program at the factory. If the decision in step S7 is Y or yes, the new program is applied in step S9 for the input DELAY, WATER and DAYS. If the decision is N or no, a decision is made in step S8 whether the time after initialization is greater than 5 minutes. If the decision is N or no, the program loops back to step S7. If the decision is Y or yes, the previously recorded program or factory default program is applied in step S10.

When the absence of water in the reservoir is sensed, in the manner noted, a water level sensor 300 which is part of the controller will send an appropriate signal to the processor 260, and the processor will cause the visual indicator or LED 320 to blink once each second, and the audio indicator or piezo chip 310 to chirp once each minute. If the low battery detector 290 senses that the battery or batteries are low, it will send an appropriate signal to the processor 260, which, in turn, will cause the visual indicator or LED to blink twice every 5 seconds and to chirp the audio indicator or piezo chip 310 once each minute. It will be appreciated that the set times and the number of activations of the indicators 310 and 320 can be varied as desired.

Figure 13:
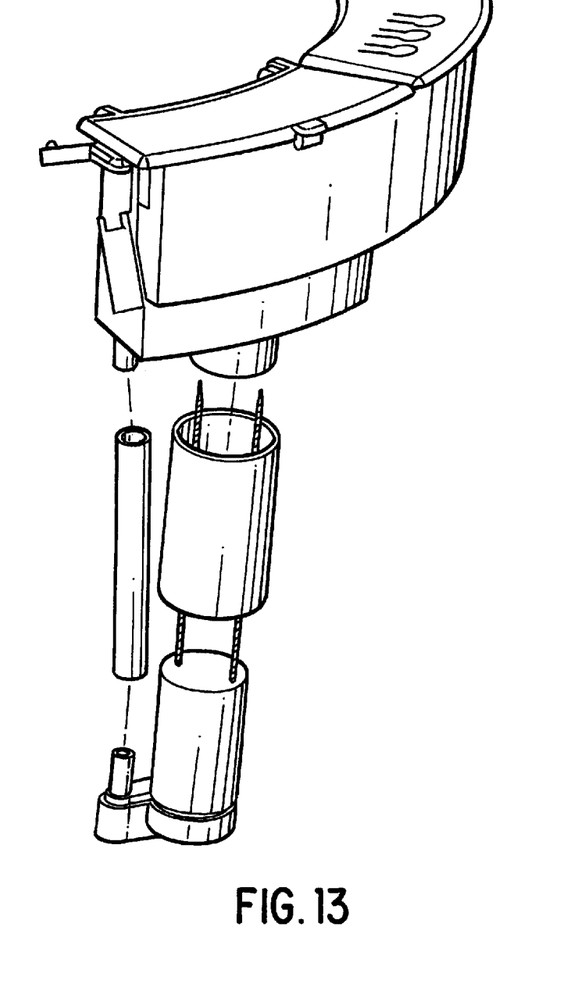
FIG. 13 is an exploded view of a modified control compartment.
Figure 14:
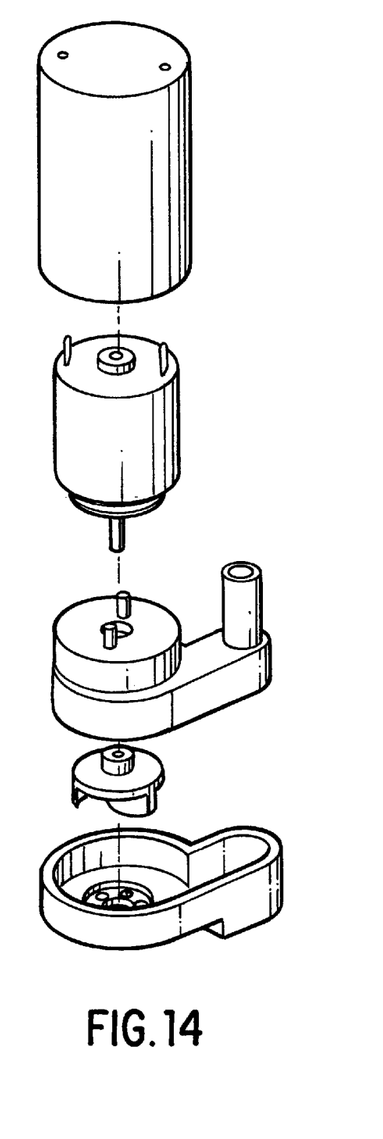
FIG. 14 is an exploded view of a the pump-motor for the modified control compartment of FIG. 13.

A preferred form for the housing 120 is shown in FIGS. 13 and 14. The purpose for this modification, which is the best known mode for carrying out this aspect of the invention, is to accommodate different size pots. As shown, housing 120 is broken down into three components, namely, an upper compartment 400, a lower motor-pump set 402 and an intermediate piping 404, which can be of different sizes.

In this manner the components 400 and 402 may be fixed in shape and dimensions, with the intermediate piping accommodating pots of different size. This of course, is dependent on the size range of the pots, and some adjustment in shape or dimension of the components 400 and 402 may be dictated by the extremes of pot size.

The details of the motor-pump set 402 are shown in FIG. 14 where like parts have been given the same reference numbers. The outlet pipe 406 from the pump is cutoff as indicated at 408. Likewise the outlet pipe 410 leading through the upper compartment 400 is cutoff as indicated at 412. Motor leads 414 extend from the battery in the upper compartment 400 to the motor 180 terminals 186 passing through the motor cover 416 in a sealed fashion. The motor cover 416 completely encompasses the motor 180 and is sealed in an airtight manner to the raised platform 418 at the top of the motor mount 420. The motor leads 414 also pass through the larger pipe 422 of the intermediate piping 404. Pipe 422 has an internal diameter to allow it to be press fitted onto the motor cover 416 at its lower end, and press fitted to a mounting stub 424 at its upper end. Similarly, the smaller pipe 426 of the intermediate piping 404 and has an internal diameter to allow it to be press fitted over pipe 406 at its lower end, and over pipe 410 at its upper end to provide a flow path of requisite integrity for delivering the pump output to the discharge in the upper compartment. By simply using intermediate piping 404 of different lengths, different size pots can be easily accommodated.

Although the present invention has been shown and described in terms of a preferred embodiment, it will be appreciated that changes and modifications will be evident to those skilled in the art from knowledge of the teachings of the present invention. Such changes and modifications, which do not depart from the spirit, scope and teachings herein, are deemed to fall within the purview of the invention as set forth in the appended claims.

What is claimed is:

1. A self-contained automatic watering system for plants comprising,
   (a) a container open at the top,
   (b) a distributor mounted adjacent the open top of the container extending at least partially around the periphery of the container,
   (c) a water reservoir,
   (d) a housing extending into said reservoir, said housing containing a pump located in said reservoir, a motor to drive said pump, and a conduit leading from the pump to the distributor for directing water peripherally onto the distributor, and
   (e) a controller for controlling the motor to initiate watering cycles according to a preselected program regarding the frequency of watering and quantity of water.

2. A self-contained automatic watering system for plants comprising,
   (a) a container open at its top comprised of an inner and outer pot nested to define an annular space therebetween to serve as a reservoir for water to be used for watering a plant held in the inner pot,
   (b) a distributor mounted adjacent the opening at the top of the container extending at least partially around the periphery of the container,
   (c) a housing easily detachably mounted on said container and extending into the annular space, said housing containing a pump having an inlet and outlet located in said annular space, a motor to drive said pump, and a conduit leading from the pump outlet to the distributor for directing water peripherally onto the distributor, and (d) a controller for controlling the motor to initiate watering cycles according to a preselected program regarding the frequency of watering and quantity of water.

3. A watering system according to claim 2 wherein the distributor includes an inclined wall.

4. A watering system according to claim 2 wherein said housing is easily detachably mounted in said container.

5. A watering system according to claim 2 wherein said conduit terminates in a tee having two branches, one to direct water from the reservoir peripherally around the distributor and the other to direct water radially into the container.

6. A watering system according to claim 2 wherein the housing defines two compartments, one containing the motor and pump and the other containing the controller.

7. A watering system according to claim 2 wherein an audible indicator is provided that is controlled by the controller.

8. A watering system according to claim 2 wherein a visual indicator is provided that is controlled by the controller.

9. A watering system according to claim 2 wherein a means is provided to detect the presence of water in the reservoir.

10. A watering system according to claim 2 wherein a power level sensor is provided that provides a signal to the controller.

11. A watering system according to claim 2 wherein the controller is provided with input keys.

12. A watering system according to claim 11 wherein the input keys include a key for inputting a delay into the controller, a key for inputting the quantity of water to be delivered to the plant and a key for inputting the frequency of delivery of water.

13. A watering system according to claim 1 wherein the housing is divided into three parts, an upper part, a lower part and an intermediate part.

* * * * *